METHOD OF REMOVING HEMICELLULOSE FROM WOOD PULP riginal Filed Sept. 10, 1946 3 Sheets-Sheet 1

INVENTOR.
Jack McK. Limerick
BY
Ross Albury

METHOD OF REMOVING HEMICELLULOSE FROM WOOD PULP

Original Filed Sept. 10, 1946 3 Sheets-Sheet 2

INVENTOR.
Jack McK. Limerick
BY
Ross Ashurey

METHOD OF REMOVING HEMICELLULOSE FROM WOOD PULP

Original Filed Sept. 10, 1946 3 Sheets-Sheet 3

INVENTOR.
Jack McK. Limerick
BY
Ross Albury

Reissued Sept. 14, 1954 Re. 23,868

UNITED STATES PATENT OFFICE 23,868

METHOD OF REMOVING HEMICELLULOSE FROM WOOD PULP

Jack McK. Limerick, Bathurst, New Brunswick, Canada, assignor to Bathurst Power & Paper Company Limited, Bathurst, New Brunswick, Canada Original No. 2,592,300, dated April 8, 1952, Serial No. 696,009, September 10, 1946. Application for reissue April 8, 1954, Serial No. 421,995

4 Claims. (Cl. 92—16)

Matter enclosed in heavy brackets [ ] appears in the original patent but forms no part of this reissue specification; matter printed in italics indicates the additions made by reissue.

It is a primary object of this invention to provide a method of treating wood pulp so as to produce an end product containing more than 96% alpha cellulose and have a yield of such product exceeding 80% of the original weight of the pulp treated.

The above and other objects will be made clear from the following detailed description taken in connection with the annexed drawings in which.

Ordinarily wood pulp as it comes from the digester, and almost regardless of the process by which the pulp has been produced, contains between 85 and 89% pure alpha cellulose—the balance being made up of a small amount of residual lignin and hemicellulose. It is clear, therefore, that purification would result in a yield of between 85 and 89% alpha cellulose based on the original weight of the pulp. If the treated pulp is to be used for the manufacture of rayon, 92 or 93% alpha content is sufficient but if the pulp is to be used for the formation of clear cellulose acetate, the minimum permissible quality is 96% alpha. Under the practice of the prior art the law of diminishing returns operates severely upon any attempt to raise quality above 92% alpha cellulose and the yield drops off abruptly. For example: in one instance of current practice, there is an 80% yield with an alpha cellulose content of 92% while when the quality is raised to 96% the yield drops to 67%. The process of the instant invention, however, has regularly produced qualities between 96 and 97% alpha cellulose with yields between 83 and 84%. This is an enormous economic difference.

Figure 1:
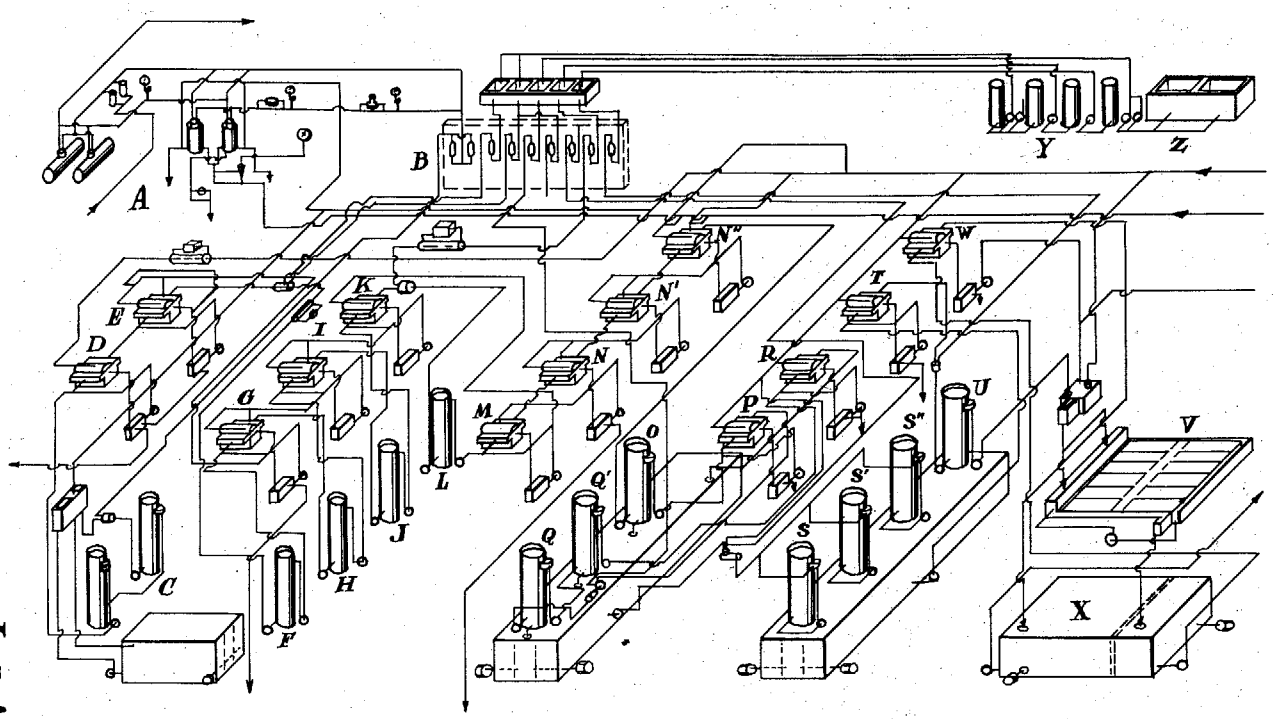
Fig. 1 is an isometric diagram illustrating a preferred arrangement of equipment for carrying out the improved process.

Referring now to Fig. 1 there is illustrated in the upper left-hand corner a largely conventional installation A for vaporizing liquid chlorine from tank cars and bringing it into the system. A control panel is illustrated at B, the initial chlorination stage at C, a fresh water washing following chlorination at D, the first dilution step at E, the first steep at F, the second dilution at G, the second steep at H, the third dilution at I, the third steep at J, the fourth dilution at K, the fourth steep at L, the thickening step at M, three consecutive washings at N, N' and N'', the soaking stage at O, the washing following the soak at P, the first hypochlorite stage at Q and Q', the wash following the first hypochlorite stage at R, the second hypochlorite stage at S, S' and S'', the wash following the second hypochlorite stage at T, the sulphur dioxide stage at U, the screening following the sulphur dioxide stage at V, wash following the screening at W, the final stock chest at X. Y represents the sulphur dioxide supply and Z the hypochlorite supply.

Figure 2:
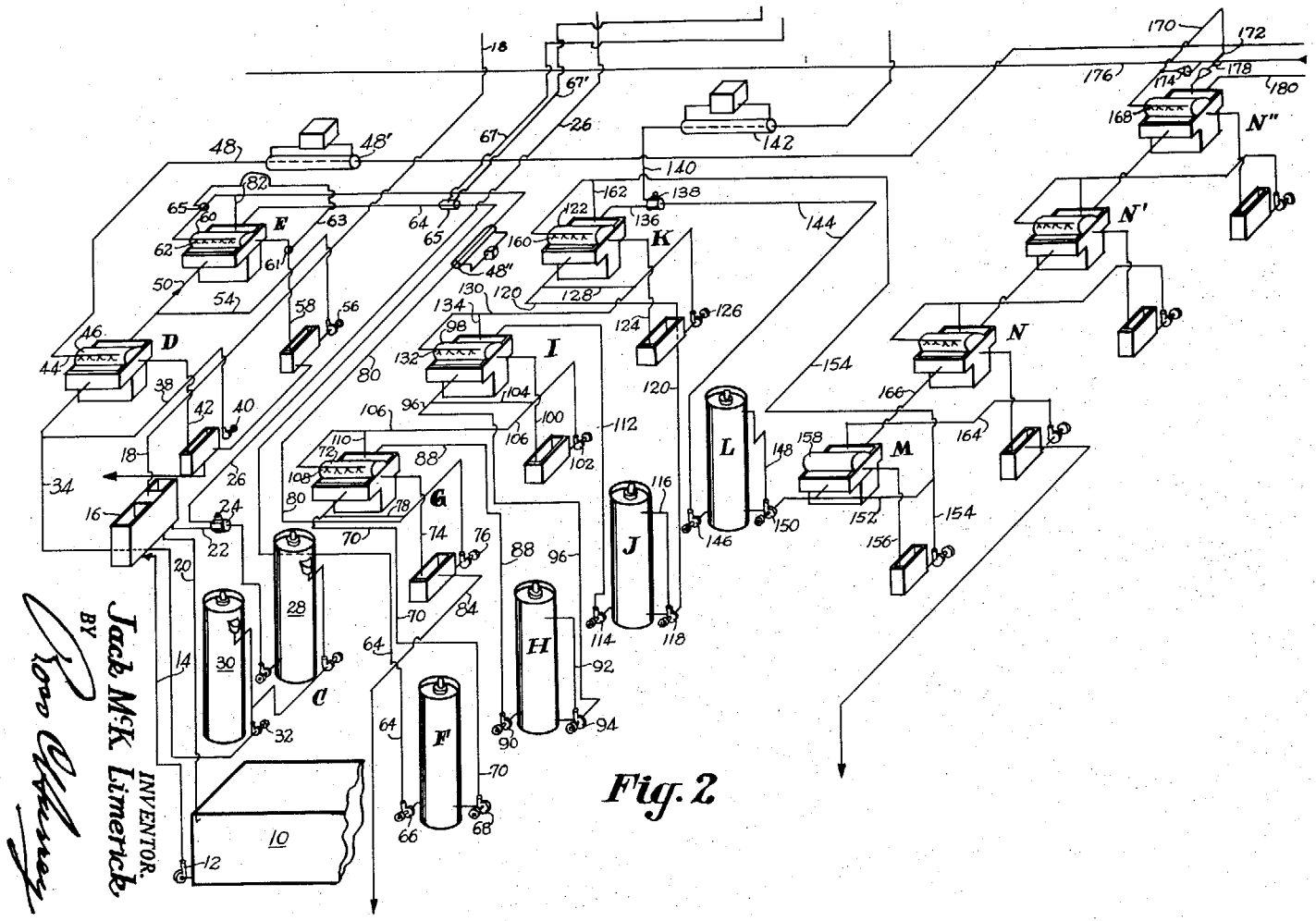
Fig. 2 is an enlarged view of the left-hand side of Fig. 1.

Referring now to Fig. 2: washed, unbleached sulphite pulp is stored in a stock chest 10 at a consistency between 8 and 11%. A pump 12, through a line 14, sends the pulp to a mixing box 16 where, through a line 18, it is diluted with fresh water to about 3–4% consistency. The mixing box 16 is conventional and has a return line 20 to take excess pulp back to the stock chest 10. Dilute pulp leaves the box 16 through a line 22 and passes through a mixer 24 which also receives chlorine from plant A (shown in Fig. 1) through a line 26 from control panel B. The pulp and chlorine then pass in sequence through towers 28 and 30 which constitute station C. The chlorine used preferably amounts to 65% of all chlorine to be used. It is a real bleaching step. A pump 32 takes the pulp from tank 30 through a line 34 to a washer and a thickener D. On entering the washer D the pulp is diluted to 1% consistency by means of a line 38 supplied by a pump 40 which receives water from the suction line 42 of the washer D. A fresh water shower 44 washes the pulp as it passes over the drum 46 of the washer D, the shower 44 being supplied by a fresh water line 48. The pulp preferably at about 12.5% consistency leaves the washer D through a line 50 to a washer E.

Depending on the type of pulp it may be desirable not only to give the pulp a direct chlorine bleach in towers 28 and 30 but to follow this by a hypochlorite bleach. In such case the first hypochlorite stage Q—Q' will be placed between the washer D and the washer E. It will also be desirable to add a washer similar to washer D between the relocated hypochlorite stage Q—Q' and the washer E. The latter (E) as will appear hereinafter, functions not only to "wash" the pulp but primarily to release the liquor which is contained in the pulp as it approaches the washer with treatment liquor and thus to avoid dilution or contamination of the treatment liquor. A wash step such as D permits operation of the washer E to be concentrated on the replacement as distinct from the washing function.

On entering the washer E the pulp is diluted to about 1% consistency by a line 54 supplied by a pump 56 from the suction line 58 of the drum 60 of the washer E. A shower 62 plays on the drum 60. The washer E first thickens to 6–7% consistency and then dilutes the pulp to about 3–5% consistency. The pulp leaves the washer E through a line 64 which feeds a pump 66 which passes the pulp through a steeping tower F.

Since the actual removal of hemi-cellulose begins as the pulp leaves washer E, it is essential that the treating liquor supplied by line 82 and shower 62 be not diluted by liquor carried over from washer D. Accordingly the volume of shower 62 is adjusted relative to the suction on the drum 60 so that shower liquor is drawn completely through the pulp mat on the drum, thereby displacing the liquor in the pulp ahead of the shower. In order to maintain control, a pH controller 61 is placed in the line 58. The controller 61 acts, through any conventional line 63 to control a valve 65 in the supply line of the shower 62. The volume of shower 62, therefore, is regulated to maintain a pH in the line 58 sufficiently high to guarantee that liquor from shower 62 is drawn through the pulp mat.

The line 64 contains a mixer 65 which receives dilute caustic (NaOH) from the control panel B through a line 67, and for pitch control, sodium phosphate may be supplied through a line 67'. This caustic supply is used as a control to effect adjustment of the liquor concentration. As will later appear, when the process is seen as a whole, an adjustment of concentration in the fresh liquor added at the last steep would require considerable time to affect all of the steeps. The mixer 65 greatly shortens this lag. The vital factor to be controlled is hemi-cellulose concentration. Control is used early at the first steep for the reason that only there can an excessive concentration develop.

From the tower F a pump 68 sends the pulp through a line 70 to a washer G. It is to be noted that the suction on the drum 72 of washer G draws liquor through a line 74 and that this liquor by means of a pump 76 is used, first, by means of a line 78, to dilute the stock going to washer G to a consistency of 1%. The remaining portion of the liquor goes through a line 80 to the shower 62 of washer E and also, through a line 82, to dilute the pulp leaving the washer E.

Since the total liquor removed from washer G through line 74 is greater than the total demand of lines 78 and 80 the excess liquor is bled off through a line 84 and is disposed of in a manner to be described hereafter.

Washer G first thickens the pulp to a consistency of 12–13% and then dilutes it back to 3–5%. The dilute stock leaves washer G through a line 88 through which, by means of a pump 90, it is circulated through a second steeping tower H. The pulp leaves the tower H through a line 92 and by means of a pump 94 is delivered through a line 96 to a washer I. The suction drum 98 of the washer I delivers extracted liquor through a line 100 and this liquor is distributed by a pump 102 through a line 104 to dilute the pulp in line 96 to 1% consistency and by means of a line 106 the balance of the liquor extracted is delivered to a shower 108 on washer G and through a line 110 the liquor in line 106 also dilutes the pulp leaving the washer G.

The drum 98 of washer I thickens the pulp to 7–8% consistency. The pulp is then re-diluted to a 3–5% consistency and leaves the washer I through a line 112. The line 112 supplies a pump 114 which feeds the pulp through a third steeping tower J. The pulp leaves the steeping tower J through a line 116 and by means of a pump 118 is supplied by a line 120 to a washer K.

The liquor extracted by the drum 122 of washer K leaves the washer through a line 124 and by means of a pump 126 is delivered through a line 128 to intercept the pulp line 120 and to dilute the pulp to a consistency of 1%; the balance of the liquor through a line 130 serves a shower 132 of the washer I and through a line 134 dilutes the pulp going to the steeping tower J.

The drum 122 of the washer K thickens the pulp to a consistency of from 10–12%. The pulp is then diluted to 4–5% consistency and leaves the washer K through a line 136 which feeds a mixer 138. The mixer 138 also receives, via the control panel B (Fig. 1), a line 140 which supplies sufficient fresh caustic liquor to dilute the pulp to 3–5% consistency. For a purpose to be described later the line 140 is passed through a refrigeration unit 142.

The pulp leaves the mixer 138 through a line 144 and is delivered by pump 146 to the fourth steeping tower L and leaves the tower L through a line 148. The line 148 feeds a pump 150 which sends the pulp to a thickener M which brings the pulp to 22–24% consistency. The pulp entering the thickener M is diluted to 1% consistency by a line 152 which is supplied by a line 154 which in turn receives its liquor from the suction line 156 of the drum 158 of the thickener M. The line 154 supplies a shower 160 and, through a line 162, supplies dilution liquor to the washer K. The sole function of the thickener M is to remove as much liquor as possible from the pulp with no dilution. It will be noted that there is no shower on the face of the drum and it may be desirable to mount press rolls over the drum to increase the liquor extraction.

The showers on washers G, I and K are operated in a manner similar to the shower on washer E, that is, the volume of these showers is sufficiently relative to the vacuum on the drums to assure shower water being drawn through the pulp mat. This effectively displaces the previous liquor and provides sharp demarcation between the several steeping stages. To attain the same demarcation by increased thickening between stages would involve costly apparatus and high power consumption. It is not necessary, at washers G, I and K to provide a pH controller as at washer E. Excessive flow of the shower 62 on washer E ultimately would mean a loss of chemicals to the sewer, as is clear in Fig. 2. "Excessive flow" in the showers on washers G, I and K is not diluted as in line 58 of washer E and is recovered in line 84 as hereafter described.

Agitation is provided in each of the steeping towers, F, H, J and L. The most important agitating effect, however, occurs in the intermediate washing steps where the extreme dilution, followed by thickening, followed by extremely agitated redilution serves thoroughly to break up any zones of hemi-cellulose saturated liquor around any pulp fibers. This assures maximum effectiveness of each steeping treatment. It also adds to the yield by minimizing the necessity for mechanical agitation in the steeping towers. Such agitation in a cold caustic suspension of substantial consistency (3–5%) increases the hydration and solution of alpha cellulose. Any alpha cellulose which is dissolved is lost, to the detriment of yield.

Analysis of samples indicates that, on the average, each steeping treatment accomplishes most of the hemi-cellulose dissolving of which it is capable in from 10 to 15 minutes. Uniformity of product, however, demands the safeguard of longer exposure, hence, in practice the steep is continued for from 30 to 60 minutes.

The pulp leaving the thickener M is diluted back to 1% consistency then goes through a line 166 to a washer N, thence to a second washer N', thence to a third washer N''. These washers are conventional and are arranged for regular counter-current washing. A portion of the liquor output of washer N is bled off through line 166 for a purpose to be described later.

At the washer N'' a shower 168 is supplied with fresh water from the line 170 and stock leaving the washer N'' is diluted to about 4% consistency by fresh water supplied by a line 172. The line 170 is connected through an injector by means of a line 174 with a steam line 176. A similar line and injector 178 connects the line 172 with the steam line 176.

The refrigeration unit 142 on the caustic line 140 has already been mentioned. A similar refrigeration unit 48' is placed in the line 48 which brings fresh shower water to the shower 44 of the washer and thickener D. Still another refrigeration unit 48'' is placed around the line 80 going from washer E to the first steeping tower F.

It is essential that the steeping in towers F, H, J, and L be carried out at a relatively low temperature preferably between 15 and 20 degrees centigrade. The caustic liquor entering the system through line 140 will usually be quite warm and the refrigeration unit 142 will operate to reduce temperature to the desired range. The fresh water supply at most mills, particularly northern mills, during most of the year will be within the desired range. Therefore, the refrigeration unit 48' in the line 48 will only occasionally be used, and most of the cooling will be done by heat exchangers using fresh water. The refrigeration unit 48'' in line 80 will take care of any temperature rise in the treating liquor occurring during its passage from one steeping tower to the next. It greatly reduces the time lag of a temperature change effected by unit 48. Indeed, for a good part of each year, particularly at northern mills unit 48'' will do the whole job and unit 48 need not be operated.

Figure 3:
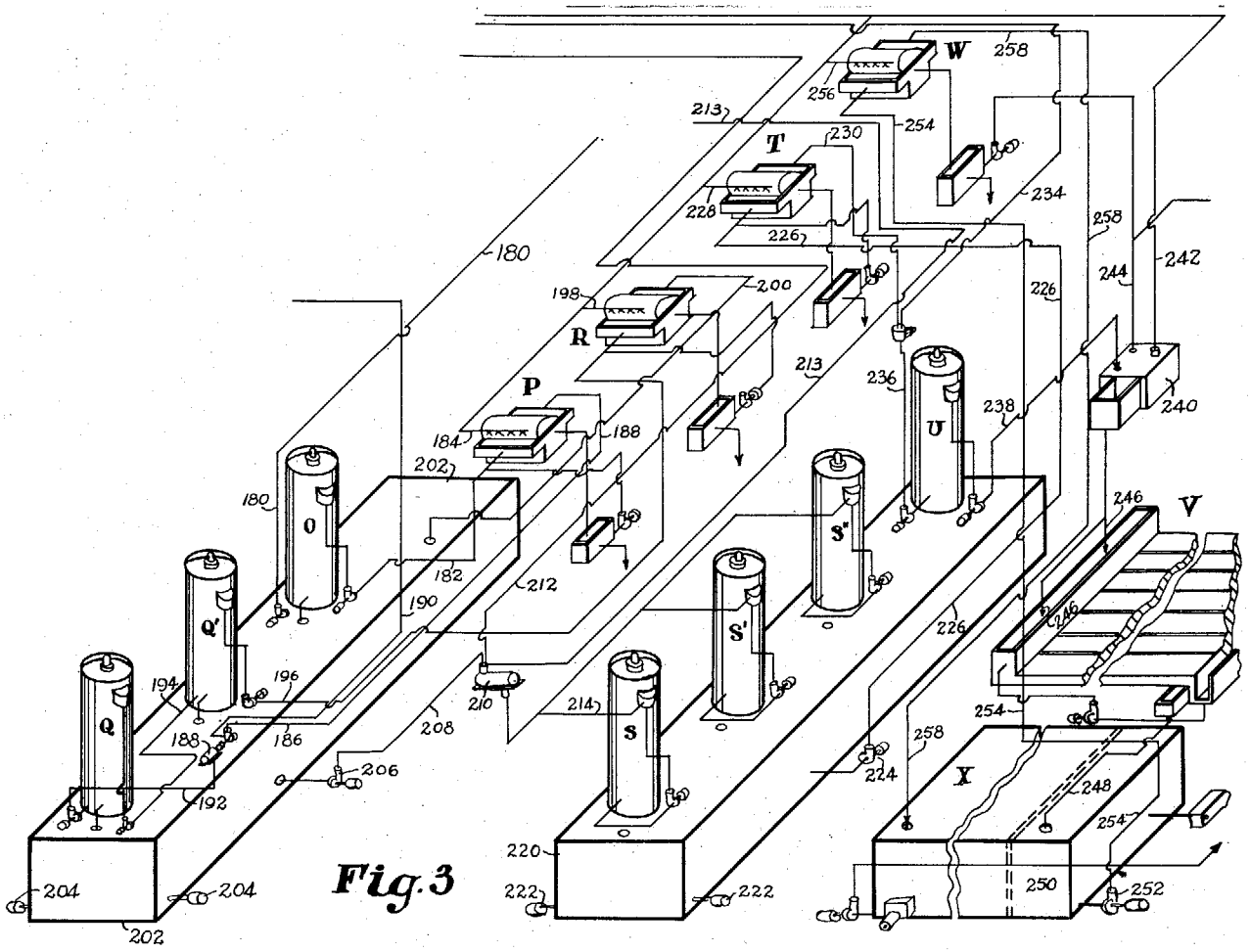
Fig. 3 is an enlarged view of the right-hand side of Fig. 1.

The pulp leaving the last washer N'' is diluted to 3–4% consistency with hot fresh water heated by the injectors 176 and 178. It goes through a line 180 to the soaking tower O shown in Fig. 3 This tower is similar in proportions to the steeping towers, F, H, J and L and, on the average, pulp will take half an hour to go through the soaking tank. The pulp leaves the tank through a line 182 and goes to a washer P where it receives a shower 184 of fresh water. Stock leaves the washer P through a line 186 which takes it to a mixer 188 where it is treated with hypochlorite solution brought to the mixer 188 through a line 190 from the hypochlorite supply Z (Fig. 1) through the control panel B also shown in Fig. 1. If desired, caustic sufficient to maintain alkalinity during the hypochlorite bleach may also be supplied to the mixer 188. Stock plus hypochlorite leaves the mixer 188 and through a line 192 goes to a hypochlorite tower Q thence through a line 194 to a second hypochlorite tower Q'. The stock leaves the tower Q' through a line 196 which takes it to a washer R where it receives a fresh water shower 198. From the washer R the stock leaves through a line 200 to a stock chest 202 where it is stored and agitated by conventional agitators 204.

A pump 206 removes from the chest 202 and, through a line 208 delivers the stock to a mixer 210. The mixer 210 receives hypochlorite solution through a line 212 which, through control panel B, receives hypochlorite solution from the bleach supply Z. A line 213 supplies fresh water to the mixer 210 as a means of controlling consistency. From the mixer 210 the stock proceeds through parallel lines 214, 216 and 218 to parallel bleaching towers S, S' and S'' respectively.

It will be noted that pulp is delivered to the top of towers S, S' and S''. When each tower is filled, the pulp is circulated in the tower and samples are periodically taken. When the sampling indicates that the desired qualities have been attained in any tower, the tower is dumped into a chest 220 where it is agitated by conventional agitators 222. This is essentially a batch operation of each tower and, through this opportunity for close control, extreme uniformity of the end product may be attained. By control of consistency, time and temperature in the last hypochlorite stage (S—S'') the solution viscosity of the finished pulp can be controlled. By "solution viscosity" is meant the viscosity in centipoise of a 1% solution of the pulp in a standardized cupramonnium solution. For ordinary viscose work, the solution viscosity should be from 20 to 30 centipoise, for acetates or nitrates the viscosity should be 30–40 centipoise. The oxidation occurring in the hypochlorite stage tends to shorten the alpha cellulose molecule and thus to lower the solution viscosity of the pulp. This should be done on the alkaline side, with pH of 8 or 9, preferably 9. Carried too far, this process produces oxy-cellulose to the detriment of yield. Such degradation of the pulp varies directly with consistency which, accordingly, must be controlled.

A pump 224 takes stock from the chest 220 and through a line 226 delivers it to a washer T where it receives a fresh water shower 228. Stock leaves the washer T through a line 230 to a mixer 232. The mixer also receives sulphur dioxide through a line 234 which is supplied via the control panel B from the $SO_2$ supply Y. From the mixer 232 stock goes through a line 235 to a treatment tower U. It leaves the tower U through a line 238 to a consistency regulator 240 where it is diluted with fresh water through a line 242 and also in part with the effluent from a washer W through a line 244. From the consistency regulator 240 stock goes thru lines 246 to a set of conventional flat screens V.

The stock was flat-screened before it was delivered to chest 10. This screening removed all of the oversized particles usually considered to be undesirable. In the course of the process, however, particularly in the bleaching stages clots are apt to form and there is always a chance that foreign material will enter the system in the wash water or the treating liquor. For this reason the processed stock is flat-screened after all treatments are concluded. The final washer W operates substantially as a thickener to remove the extreme dilution (0.28% consistency) encountered at the flat screens.

Accepted stock from the flat screens V goes through a line 248 to a chest 250 from which a pump 252 carries the stock through a line 254 to a washer W where it receives a fresh water shower 256. The finished stock then leaves the washer W through a line 258 to a finished stock chest X.

The optimum organization for the application of this process is a juxtaposition of kraft and sulphite pulp mills since the system is demonstrably superior in operation when slush pulp from the digestor, as distinct from re-wet pulp, is used. In such case the caustic liquor is ordinary white cooking liquor for the kraft process having a typical analysis as follows:

| | Percent |
|---|---|
| Sodium hydroxide | 7.00 |
| Sodium sulphide | 4.25 |
| Sodium carbonate | 1.50 |
| Sodium sulphate | .83 |

With such an installation the bleed-off through lines 84 and 166 may be evaporated back to the concentration of the standard cooking liquor and may be used in the digestor. It is also permissible to use this liquor directly in the digestor. When this is done, the amount of black liquor normally used to dilute the digestor liquor is reduced. The presence of between 2 and 5% hemi-cellulose in the reclaimed white liquor, when used to make up a portion of the digestor charge, provides a species of protective colloid exercising a buffer effect against too drastic an action on the caustic of the wood. Moreover the addition of hemi-cellulose adds to the Mullen test of paper made from pulp thus digested.

It will, of course, be noted that the liquor from the last steeping stage in tower L goes from thickener M back to washer K and, therefore, recirculates in large part through the tower L. The portion of this liquor going to the shower 160 is delivered as shower and dilution water to the washer I which supplies the third steeping tower J and fresh caustic is added only at the fourth steep L.

Liquor containing the largest percentage of hemi-cellulose leaves the system through line 84 from the washer G. The rate of bleeding is adjusted proportionally to the rate of addition of fresh liquor so as to limit the maximum concentration of hemi-cellulose in the steeping liquor to not more than 5% and preferably to 3% in first steeping tower F and to 2% or less in the other steeping towers. This limitation, combined with the relatively low temperature, appears to be critical in securing the combination of high yield and high quality. As the hemi-cellulose content of the steeping liquor increases it becomes progressively more difficult to dissolve hemi-cellulose in the liquor. Also, there is a degradation both of caustic soda and of sodium sulphide with an increase in the percent of sodium carbonate. There is also a definite increase in viscosity which in turn tends to slow the process of dissolving hemi-cellulose. While 3% hemi-cellulose content in the liquor is believed to be optimum from all standpoints, it is still feasible to permit the concentration to rise to 5%. Beyond 5%, however, the ability of the liquor to dissolve hemi-cellulose drops rapidly, viscosity increases sharply and the degradation of caustic and of sodium sulphide is so marked that the liquor would not be useable in the kraft process.

The soaking step carried out in tower O is of particular advantage. It affords an opportunity for virtually complete removal, not only of caustic but also of the sodium sulphide in the kraft white liquor. If any substantial quantity of sodium sulphide were permitted to remain it would negative a corresponding portion of the hypochlorite and greatly increase bleaching costs. In addition, in practice, the use of this soaking step definitely increases quality by removing a small amount of hemi-cellulose.

The caustic steepings carried out by this process proceed on a counter-current principle, that is, fresh incoming pulp with the greatest proportion of available hemi-cellulose is subjected to the action of liquor which contains the heaviest permissible concentration of dissolved hemi-cellulose while the most potent liquor with the lowest concentration of hemi-cellulose is used to treat the pulp with the least proportion available of hemi-cellulose. This is infinitely more efficient than a single prolonged steeping. The repeated steps are also important because of the opportunity thus afforded in dilution, thickening and re-dilution for breaking up localized concentrations of hemi-cellulose adjacent the individual fibers and thus permitting the great mass of liquor to be more fully effective.

As used in the claims the term "stage" is intended to include the complete cycle of each event. That is, with reference to a steeping stage, the term "stage" includes dilution, thickening with concomitant displacement of the previous liquor, redilution and then steeping. The term "step" is used to designate any particular operation such as dilution or thickening or redilution or steeping.

I claim:

1. A multi-stage continuous process for purifying pulp each stage of which consists of the consecutive steps of providing a slurry of pulp and alkaline treating liquor in which the pulp, by weight, is from approximately 3 to approximately 5%, diluting the slurry to a pulp consistency of approximately 1% by the addition of alkaline treating liquor, then thickening the slurry to a consistency of approximately 6 to approximately 12% while simultaneously displacing the first alkaline treating liquor with a second, stronger alkaline treating liquor, then diluting the slurry to approximately 3 to approximately 5% pulp consistency by the addition of more of the second, stronger alkaline treating liquor, then advancing the thus diluted slurry continuously along a closed, predetermined path for a period of approximately fifteen to approximately sixty minutes, then repeating all of the above steps [in three to four stages] *a plurality of times* using consecutively stronger liquors for the final dilution step in each stage, the final dilution liquor in each stage coming from the thickening step of the next succeeding stage, continuously removing a predetermined proportion of liquor from one of the early stages, and continuously adding an equivalent amount of fresh liquor at the final dilution step of the last stage and regulating the rates of addition of fresh liquor and the removal of spent liquor to maintain the concentration of hemi-cellulose in the liquors below 5%, the several diluting steps being carried out with agitation to break up localized concentrations of dissolved hemi-cellulose adjacent the individual pulp fibers.

2. The process set forth in claim 1 in which the pulp following the several stages therein set forth is washed and then steeped approximately fifteen to approximately sixty minutes in hot fresh water.

3. The process set forth in claim 1 in which the stages therein set forth are preceded by a bleaching treatment with a fresh water washing stage intermediate the bleaching treatment and the said stages set forth in claim 1, said bleaching treatment using an agent selected from the group of chlorine and hypochlorites.

4. The process set forth in claim 3 in which the pulp following the completion of the process of claim 3 is given a fresh water wash and then is steeped for approximately fifteen to approximately sixty minutes in hot fresh water.

References Cited in the file of this patent or the original patent

UNITED STATES PATENTS

| Number | Name | Date |
|---|---|---|
| 1,632,802 | Richter | June 21, 1927 |
| 1,742,218 | Richter | Jan. 7, 1930 |
| 1,798,987 | Rue | Mar. 31, 1931 |
| 1,801,782 | Richter | Apr. 21, 1931 |
| 1,829,378 | Thiriet | Oct. 27, 1931 |
| 1,906,885 | Richter | May 2, 1933 |
| 1,933,609 | Wagner | Nov. 7, 1933 |
| 2,041,666 | Richter | May 19, 1936 |
| 2,249,174 | Richter | July 15, 1941 |
| 2,324,230 | Olsen | July 13, 1943 |
| 2,383,684 | Richter | Aug. 28, 1945 |
| 2,385,259 | Collings | Sept. 18, 1945 |

OTHER REFERENCES

Cellulose and Cellulose Derivatives by Ott, published by Interscience Publishers, Inc., New York (1943), pages 274, 511 to 515, 601 to 603, 813 and 814.